(12) United States Patent
Kajii et al.

(10) Patent No.: US 6,412,309 B1
(45) Date of Patent: Jul. 2, 2002

(54) GLASS QUENCHING APPARATUS

(75) Inventors: Masuhide Kajii; Norihiro Fujioka; Tohru Futagami, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/614,275

(22) Filed: Jul. 12, 2000

(30) Foreign Application Priority Data

Jul. 13, 1999 (JP) .......................................... 11-199623

(51) Int. Cl.[7] .............................................. C03B 27/04
(52) U.S. Cl. .............................. 65/348; 65/114; 65/115; 65/182.2; 65/351
(58) Field of Search ........................... 65/115, 348, 351, 65/182.2, 114

(56) References Cited

U.S. PATENT DOCUMENTS

| | | | | |
|---|---|---|---|---|
| 3,186,815 A | * | 6/1965 | Jochim | 65/351 |
| 4,046,543 A | * | 9/1977 | Shields | 65/182.2 |
| 4,402,723 A | * | 9/1983 | Schultz | 65/348 |
| 4,444,579 A | * | 4/1984 | Dunn | 65/351 |
| 4,711,655 A | * | 12/1987 | Schultz | 65/351 |
| 5,334,234 A | * | 8/1994 | Anttonen | 65/348 |
| 5,846,281 A | * | 12/1998 | Nikander | 65/114 |

FOREIGN PATENT DOCUMENTS

| | | | | |
|---|---|---|---|---|
| GB | 1212208 | * | 11/1970 | 65/115 |
| JP | 3-271128 | | 3/1990 | |

* cited by examiner

*Primary Examiner*—James Derrington
(74) *Attorney, Agent, or Firm*—Merchant & Gould, P.C.

(57) ABSTRACT

A glass quenching apparatus for quenching a glass sheet heated to a predetermined temperature, includes a first nozzle group for jetting blower air onto opposite surfaces of the glass sheet, and a second nozzle group for jetting compressor air onto at least one of the opposite surfaces of the glass sheet. The first nozzle group is comprised of stationary nozzles, and the second nozzle group is comprised of movable nozzles which are capable of moving parallel to a plane of the glass sheet. The glass quenching apparatus of the foregoing construction is able to quench the glass sheet uniformly over the entire area thereof without undue wastage of quenching air.

17 Claims, 14 Drawing Sheets

GLASS QUENCHING APPARATUS

BACKGROUND OF THE INVENTION

1. Field of the Invention

The present invention relates to an improvement in a glass quenching apparatus for quenching a heated glass sheet to manufacture tempered glass.

2. Description of Related Art

FIG. 14 hereof diagrammatically illustrates a conventional glass manufacturing method which is designed to manufacture tempered glass sheets of a thickness in the range of 3 mm to 5 mm. In general, such glass sheets of a 3 mm to 5 mm thickness are called normal-thickness glass sheets.

In the glass manufacturing method of FIG. 14, air jets 102 are emitted upward from a floating bed 101 within a heating furnace 100 so that a glass sheet 104 is floated above the floating bed 101 by the pressure of air jets, and the floated glass sheet 104 is heated to a predetermined temperature higher than its softening point or temperature while it is transferred as indicated by a profiled arrow.

Then, the heated glass sheet 104 is delivered from the heating furnace 100 to a glass quenching station 106, where air 108 is blown onto opposite surfaces of the glass sheet 104 to thereby quench the heated glass sheet 104. With this quenching, a compressive layer is formed in and along the surface of the glass sheet 104, which increases the strength of the glass sheet 104.

Subsequently, the thus-quenched or tempered glass sheet 104 is conveyed to a next station by a bed of rollers 109.

As is known in the art, the quenched glass sheet has an increased strength by virtue of a compressive layer formed in and along its surface by rapidly cooling, i.e., quenching, the surface of a glass sheet heated up to a predetermined temperature to thereby produce a temperature difference between the surface and interior of the glass sheet. Thus, a glass sheet having a smaller thickness, such as 1.5 mm–3.0 mm, than that of the normal-thickness glass sheet (hereinafter referred to as "small-thickness glass sheet") is cooled in the interior more readily than the normal-thickness glass sheet.

Accordingly, for such small-thickness glass sheets, it is necessary to quench their surface within an even shorter time than for the normal-thickness glass sheets.

One example of the conventionally-known methods for quenching the small-thickness glass sheets is shown in Japanese Patent Publication No. HEI 6-24995 under the title of "Method of Manufacturing Tempered Glass Sheets". According to the disclosed method, a small-thickness glass sheet is quenched within a short time period by a combined use of compressor air and blower air. Specifically, the air supplied from the compressor (compressor air) is rapidly decompressed in a nozzle to produce a shock wave, so that the compressor air with the shock wave produced therein is blown onto the small-thickness glass sheet and simultaneously the air supplied from the blower (blower air) is blown onto the small-thickness glass sheet to thereby quench the glass sheet.

With the known quenching methods, however, various inconveniences are encountered when small-thickness glass sheets of different sizes are to be quenched, as set forth below in relation to a case where small-thickness glass sheets of two different sizes are each formed into a curved tempered glass sheet.

FIGS. 15A and 15B are schematic views explanatory of basic operating principles of a conventionally-known glass quenching apparatus. More specifically, FIG. 15A illustrates an example where a small-thickness glass sheet 110 of a relatively large size (width W1) is quenched, and FIG. 15B illustrates an example where a small-thickness glass sheet 120 of a relatively small size (width W2) is quenched.

In the example shown in FIG. 15A, air jets are emitted upward from a floating bed 109 of the glass quenching apparatus so that the small-thickness and large-size glass sheet 110 previously curved at a preceding stage is floated above the floating bed 109 by the pressure of air jets. Then, the floated glass sheet 110 is retained at one edge (right edge in FIG. 15A) 110a by a holder 112 of a transfer arm 111. During emission of the air jets from the floating bed 109, air is jetted downward through a plurality of nozzles 113.

Under these conditions, a conveyor chain 114 is driven to move the glass sheet 110, via the transfer arm 111, in a direction normal to the plane of the sheet of FIG. 15A, so that the glass sheet 110 is quenched during the movement by the chain 114.

It is also generally known that a central region of glass sheets is hard to cool while edge regions of glass sheets are easy to cool. Because of this physical principle, there is a need to enhance the cooling capability of the quenching apparatus at a position P1 corresponding to a central region 110b of the small-thickness and large-size glass sheet 110. The terms "cooling capability" refer to a degree at which the heat of the heated glass can be absorbed by the air jets. Namely, the greater cooling capability can quench the glass sheet within a shorter time.

In the example shown in FIG. 15B, similarly to the example of FIG. 15A, the small-thickness and small-size glass sheet 120 previously curved at the preceding stage is retained at its right edge 120a in this figure by the holder 112 of the conveyor chain 114 and moved by the conveyor chain 114 via the transfer arm 111 in the direction normal to the plane of the sheet of FIG. 15B, so that the glass sheet 120 is quenched during the movement by the chain 114. Because a central region 120b of the glass sheet 120 is hard to cool as compared to the sheet edge portions, there is a need to enhance the cooling capability of the quenching apparatus at a position P2 corresponding to the central region 120b of the small-thickness and small-size glass sheet 120. Because, in this example, the glass sheet 120 is set on the floating bed 109 with its right edge 120b used as a positional reference and then moved in the direction normal to the plane of the sheet of the figure while being maintained in this positional condition, tile central region 120b of the small-size glass sheet 120 is displaced rightward from the central region 110b of the large-size glass sheet 110.

Namely, the glass quenching apparatus shown in FIGS. 15A and 15B is designed to quench each of the small-thickness glass sheets 110 and 120 by retaining the reference edge (right edge) 110a or 120a of the glass sheet via the holder 112 to support the glass sheet in a predetermined place above the floating bed 109, i.e., by setting the glass sheet on an edge-guided basis. Because the glass sheets 110 and 120 of two different (large and small) sizes are set on such an edge-guided basis, the respective central regions of the sheets 110 and 120 would be significantly displaced from each other above the floating bed 109, so that there arises a need for the quenching apparatus to have increased cooling capabilities at two positions P1 and P2. This means that for use with three or more different sizes of glass sheets, the quenching apparatus needs to have increased cooling capabilities at three or more separate portions.

Accordingly, the conventional glass quenching apparatus of the foregoing construction requires a high equipment cost, which increases the cost of tempered glass sheets.

Additionally, the conventional glass quenching apparatus, when used for quenching small-thickness glass sheets, induces an increase in manufacturing cost because a large quantity of air is wasted for quenching other regions of the small-thickness glass sheets than the central region.

SUMMARY OF THE INVENTION

It is therefore an object of the present invention to provide a glass quenching apparatus which is capable of quenching tempered glass sheets without increasing the cost of the tempered glass sheets.

To achieve the foregoing object, the present invention provides a glass quenching apparatus for quenching a glass sheet heated to a predetermined temperature, comprising: a first nozzle group for jetting blower air onto opposite surfaces of the glass sheet, the first nozzle group being comprised of stationary nozzles; and a second nozzle group for jetting compressor air onto at least one of the opposite surfaces of the glass sheet, the second nozzle group being comprised of movable nozzles which are capable of moving parallel to a plane of the glass sheet.

Since the second nozzle group is movable, it can be located at an optimum position with respect to a desired region (namely, hard-to-cool portion) of any of glass sheets of different sizes. The hard-to-cool portions of the glass sheets can, therefore, be quenched under optimum conditions. The remaining region or portion of the glass sheets is quenched by the first nozzle group under optimum conditions. Thus, merely by adding the second nozzle group, quenching of the respective hard-to-cool portions of the various small-thickness glass sheets can be achieved. The equipment cost of the glass quenching apparatus is relatively low. Additionally, since the movable second nozzle group is able to focus the compressor air onto the desired region (hard-to-cool portion) of the small-thickness glass sheet, compressor air can be used efficiently without loss.

The glass quenching apparatus may further include a nozzle moving device for moving the second nozzle group in both a first direction transverse to a direction of movement of the glass sheet, and a second direction perpendicular to the plane of the glass sheet.

The nozzle moving device enables accurate positioning of the second nozzle group relative to the desired region (hard-to-cool portion) of any of the glass sheets of different sizes. To improve the positioning accuracy, the apparatus may further include an adjusting device associated with the nozzle moving device and operative to swing the movable nozzles horizontally and vertically so as to adjust the position of the movable nozzles relative to the desired region of the glass sheet.

The glass quenching apparatus may further include a conveyor means or unit for horizontally conveying the glass sheet using a pusher arm while the glass sheet is held in a floating condition by the pressure of blower air.

By thus conveying the glass sheet, if the second nozzle group is held stationarily at a predetermined position, air jets issued from the second nozzle group will impinge on a region or portion of the glass sheet extending continuously from a front edge to a rear edge of the glass sheet.

In the case where edge portions of a glass sheet are hard to cool due to heat transmitted directly from the arms of the conveyor unit being in contact with the glass sheet edges, the second nozzle group may be displaced to a position aligned with a path of movement of the edge portions of the glass sheet. The edge portions can be quenched by air jets issued from the second nozzle group.

BRIEF DESCRIPTION OF THE DRAWINGS

Certain preferred embodiments of the present invention will be described in more detail below, by way of example only, with reference to the accompanying drawings, in which.

DETAILED DESCRIPTION OF THE PREFERRED EMBODIMENTS

The following description is merely exemplary in nature and is in no way intended to limit the invention or its application or use.

Figure 1:
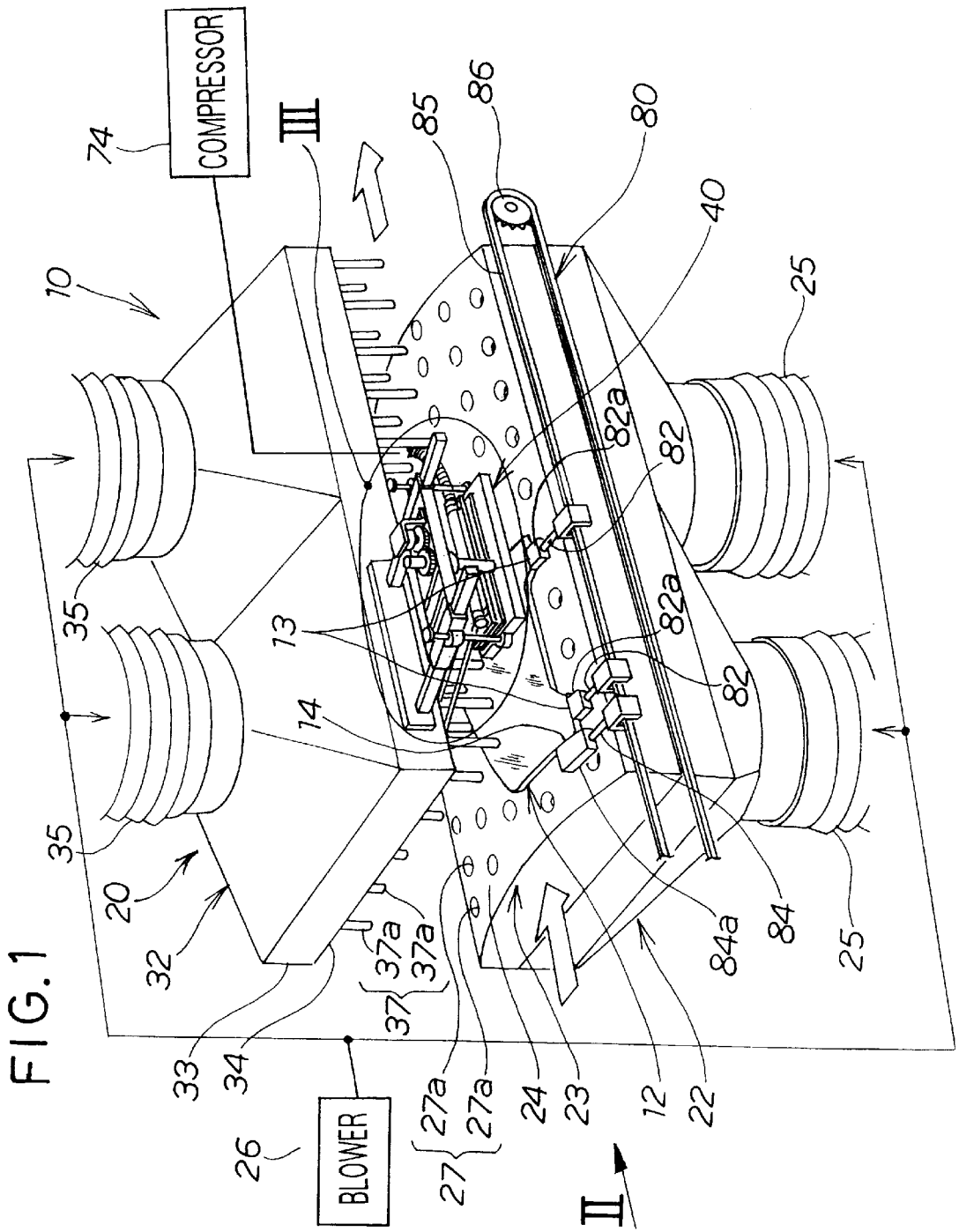
FIG. 1 is a perspective view showing a glass quenching apparatus according to a first embodiment of the present invention.

Referring now to FIG. 1, there is shown in perspective a glass quenching apparatus 10 according to a first embodiment of the present invention.

The glass quenching apparatus 10 generally comprises a first quench means or unit 20 for emitting blower air onto both an upper surface and a lower surface of a glass sheet (small-thickness glass sheet) 12 heated to a predetermined temperature, a second quench means or unit 40 associated with the first quench unit 20 for emitting compressor air onto the upper surface of the heated small-thickness glass sheet 12, and a conveyor means or unit 80 disposed on one side (right side in FIG. 1) of the first quench unit 20 for conveying the heated small-thickness glass sheet 12 in the forward direction indicated by the profiled arrows shown in FIG. 1.

The first quench unit 20 is composed of a lower quench section 22 which is designed to jet blower air from below onto a lower surface of the small-thickness glass sheet 12 to thereby quench the lower surface of the glass sheet 12 and simultaneously to raise the small-thickness glass sheet 12 in a floating condition, and an upper quench section 32 which is designed to jet blower air from the above onto an upper surface of the heated small-thickness glass sheet 12 to thereby quench the upper surface of the small-thickness glass sheet 12.

The lower quench section 22 includes a floating bed 23 having a hollow structure connected in fluid communication with a blower (blower air supply source) 26 by means of lower flexible hoses 25, 25. The floating bed 23 has a lower first nozzle group 27 opening at an upper surface 24 of the floating bed 23. With this construction, blower air supplied from the blower 26 into the floating bed 23 is jetted or blown upward from the lower first nozzle group 27 so that the small-thickness glass sheet 12 is floated above the floating bed 23 by the pressure of blower air. The lower first nozzle group 27 includes a number of lower nozzles 27a arranged or distributed in a zigzag pattern over the entire area of the upper surface 24 of the floating bed 23.

The upper quench section 32 includes an air chamber 33 connected in fluid communication with the blower 26 via two upper flexible hoses 35, 35, and an upper first nozzle group 37 projecting downward from an undersurface 34 of the air chamber 33. Blower air supplied from the blower 26 into the air chamber 33 is jetted or blown downward from the upper first nozzle group 37 onto the upper surface of the small-thickness glass sheet 12 to quench the upper glass-sheet surface. The upper first nozzle group 37 includes a number of upper nozzles 37a arranged or distributed in a zigzag pattern over the entire area of the undersurface 34 of the air chamber 33.

The conveyor unit 80 includes a plurality (two in the illustrated embodiment) of movable support arms 82 for supporting one side edge 13 (right edge in FIG. 1) of the small-thickness glass sheet 12, and a movable pusher arm 84 for forcibly moving or pushing a rear edge 14 of the small-thickness glass sheet 12 in the forward direction. The support arms 82 and the pusher arm 84 are firmly connected at one end to an endless drive chain 85 stretched between a drive sprocket 86 and a driven sprocket (not shown). When the drive sprocket 86 is rotatably driven by a drive motor (not shown), the drive chain 85 travels in a direction to move the support arms 82 and pusher arm 84 in the forward direction indicated by the profiled arrows shown in FIG. 1. With this movement of the arms 82, 84, the small-thickness glass sheet 12 is conveyed in the forward direction.

The support arms 82 each have an enlarged edge support member 82a at a distal end (free end) thereof. The edge support member 82a is engaged with the right edge 13 of the small-thickness glass sheet 12 to support the small-thickness glass sheet in position against lateral movement. The pusher arm 84 has an enlarged pusher member 84a provided at a distal end (free end) thereof for abutting engagement with the rear edge 14 of the small-thickness glass sheet 12 to move the small-thickness glass sheet 12 in the forward direction.

Figure 2:
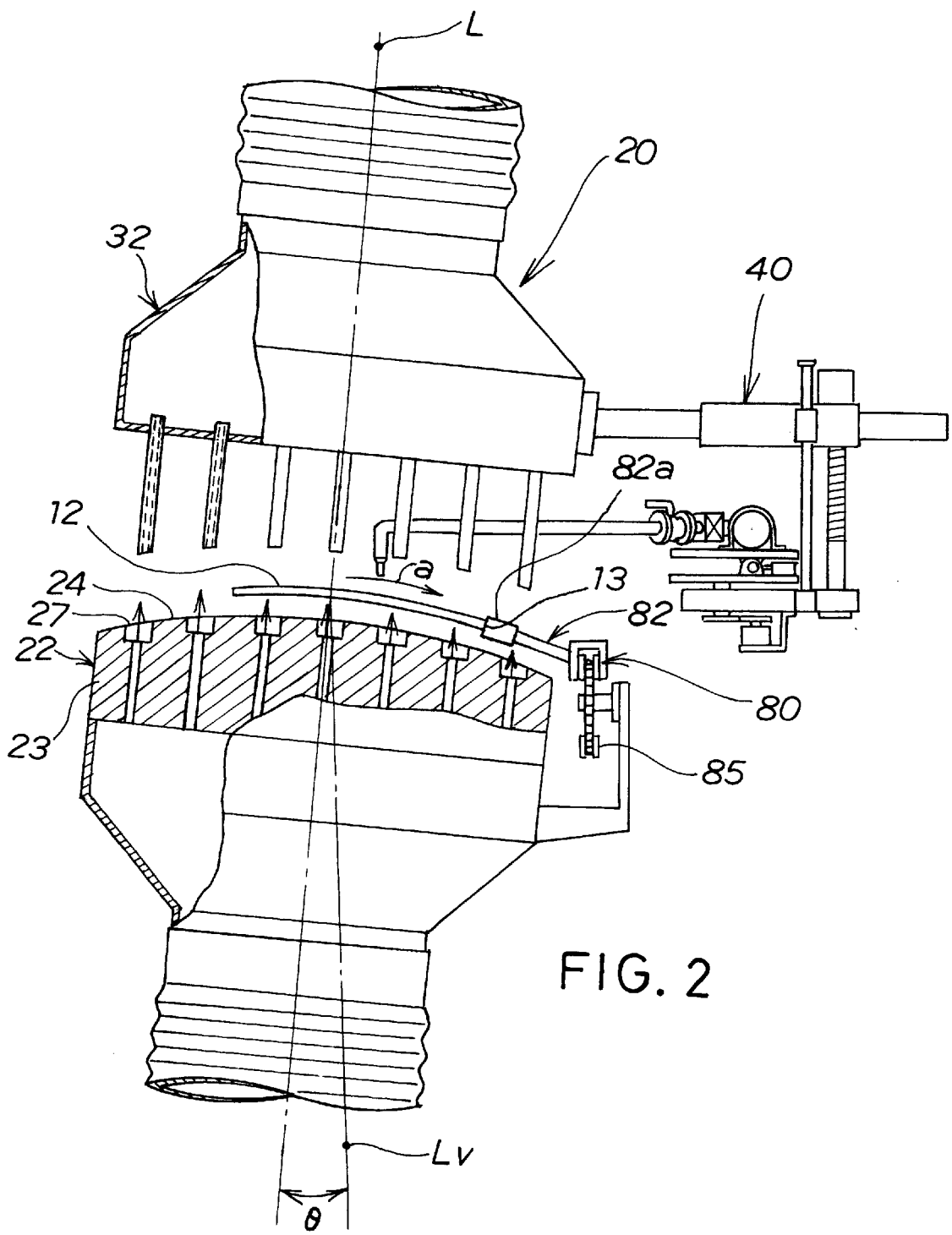
FIG. 2 is a view, partly in cross section, looking in the direction of the arrow II shown in FIG. 1.

As shown in FIG. 2, the first quench unit 20 has a vertical axis L inclined rightward at an angle θ to the perpendicular Lv so that the upper surface 24 of the lower quench section 22 tilts down toward the right.

With this inclination of the first quench unit 20, the small-thickness glass sheet 12 while being held in a floating condition above the upper surface 24 of the floating bed 23 by the pressure of blower air is forced rightward against the edge support members 82a of the support arms 82, as indicated by the arrow a in FIG. 2. The right edge 13 of the small-thickness glass sheet 12 is, therefore, stably and reliably supported by the edge support members 82a of the support arms 82 during conveyance of the small-thickness glass sheet 12 through the glass quench apparatus 10. For the purpose of illustration, the pusher arm 84 and its pusher member 84a are omitted from FIG. 2.

Figure 3:
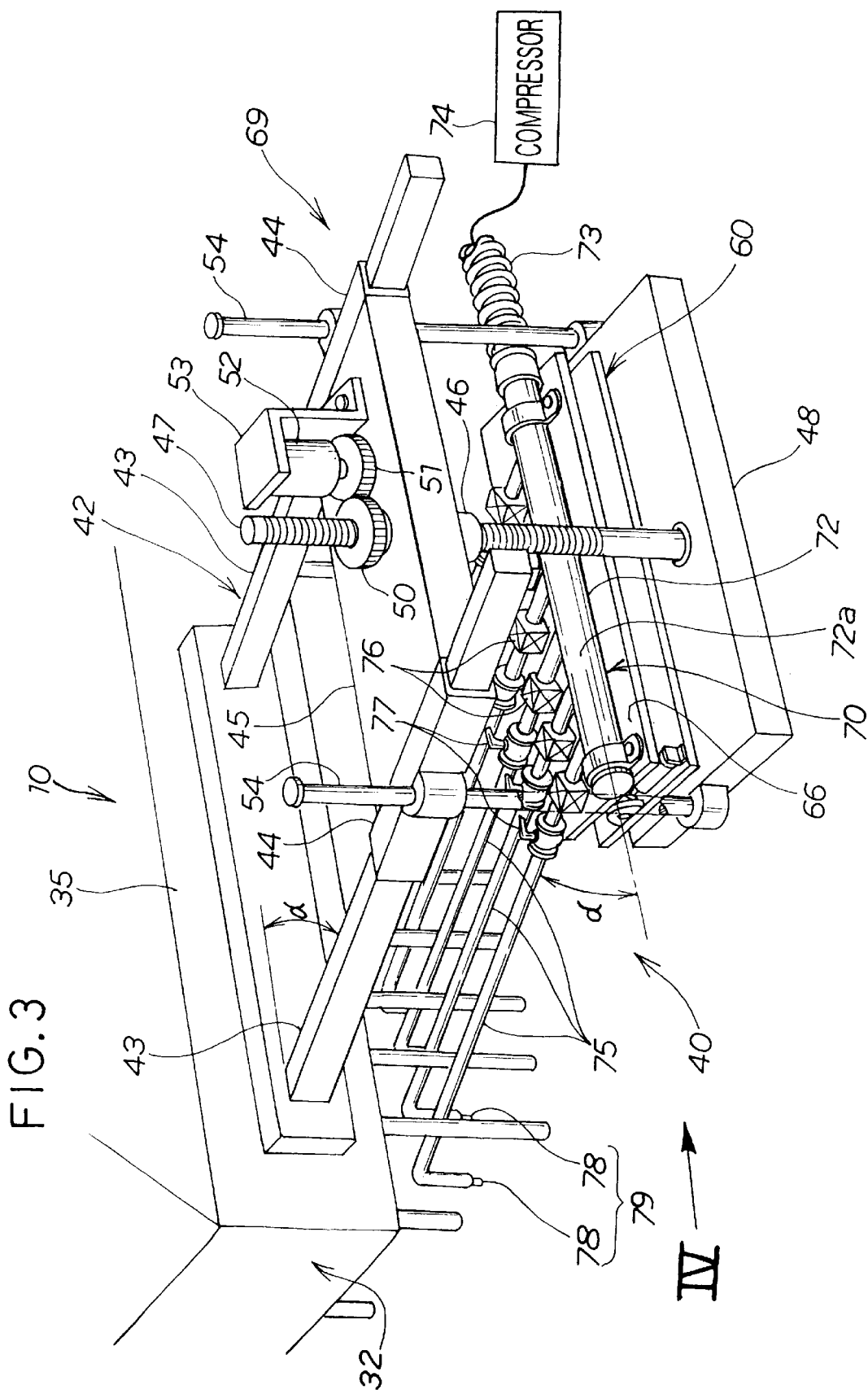
FIG. 3 is an enlarged view of a portion in a circle III shown in FIG. 1.

As shown on enlarged scale in FIG. 3, the second quench unit 40 includes a nozzle moving device 42 for moving jet nozzles (described later) left and right and up and down, an adjusting device 60 for causing the jet nozzles to swing in both horizontal and vertical planes, and a second quench section 70 provided with the jet nozzles for jetting compressor air. The moving device 42 and the adjusting device 60 together form a second nozzle group moving means or unit 69.

The moving device 42 includes a pair of parallel rodless cylinders 43, 43 cantilevered to a right side wall of the air chamber 35 of the upper quench section 32 in such a manner that the respective longitudinal axes of the rodless cylinders 43, 43 extend at an angle α to the direction of conveyance of the small-thickness glass sheet 12. Respective moving members 44, 44 of the rodless cylinders 43, 43 are connected together by a cross member 45. A nut 46 of a ball screw is mounted on a central portion of the cross member 45 so that the nut 46 is rotatable at a fixed position. A screw shaft 47 of the ball screw is threaded with the nut 46 and has a lower end rotatably connected to a lift plate 48. A driven gear 50 is attached to an upper end of the nut 46 of the ball screw and is in mesh with a drive gear 51 attached to the output shaft of a first drive motor 52. The drive motor 52 is vertically mounted on a bracket 53 attached to the cross member 45. Two upright guide rods 54, 54 fixed at lower ends thereof to the opposite ends of the lift plate 48 are slidably guided by a pair of guide sleeves (not designated) formed integrally with opposite end walls of the cross member 45. Thus, when the ball screw 46, 47 is rotatably driven by the drive motor 52, the lift plate 48 moves up and down relative to the cross member 45.

Figure 4:
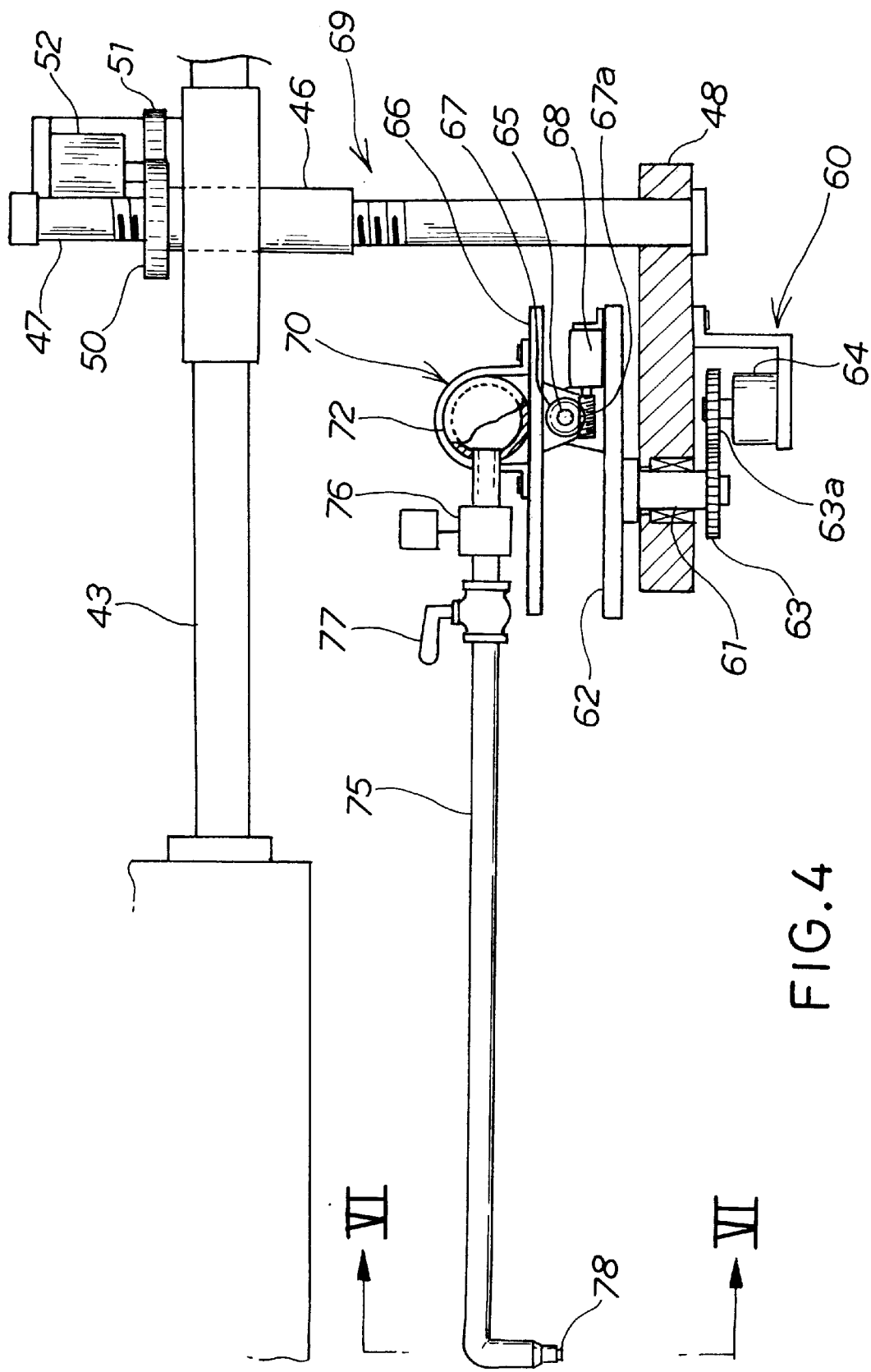
FIG. 4 is a view, with parts in cross section, looking in the direction of the arrow IV shown in FIG. 3.

The adjusting device 60, as shown in FIG. 4, includes a vertical rotary shaft 61 rotatably mounted on the lift plate 48, and a horizontal swing plate 62 attached to an upper end of the rotary shaft 61. The swing plate 62 comprises an elongated rectangular plate. A driven gear 63 is attached to a lower end of the rotary shaft 61 and is in mesh with a drive gear 63a attached to the output shaft of a second drive motor 64. The drive motor 64 is mounted on a bracket (not designated) attached to the underside of the lift plate 48. A vertical tilt plate 66 is disposed directly above the horizontal swing plate 62 and is pivotally connected at opposite ends to the opposite ends of the plate 62 by means of a pair of horizontal pins (only one being shown) 65. A worm gear 67 is attached to at least one of the pins 65 and is in mesh with a worm (drive gear) 67a attached to the output shaft of a third drive motor 68. The drive motor 68 is mounted on the horizontal swing plate 62.

Referring back to FIG. 3, the second quench section 70 includes an air-supply pipe 72 mounted on the tilt plate 66. The air-supply pipe 72 is closed at one end, the other end of the air-supply pipe 72 being connected by a flexible tube 73 to an air compressor 74. A plurality of parallel juxtaposed air-guide pipes 75 are connected at one end to a circumferential wall 72a of the air-supply pipe 72 and extend obliquely at an angle a to the axis of the air-supply pipe 72. The air-guide pipes 75 are spaced at uniform intervals in the longitudinal direction of the air-supply pipe 72. An electromagnetic valve 76 and a manual valve 77 are provided in series on a proximal end portion of each air-guide pipe 75 for controlling the flow of compressor air passing through the air-guide pipe 75. Respective free ends of the air-guide pipes 75 are bent downward at an angle of 90° and they are equipped with second nozzles 78. The second nozzles 78 form a second nozzle group 79.

The electromagnetic valve 76 is an on-off valve operative, on the basis of a control signal supplied from a control unit (not shown), to selectively block and allow the passage of compressor air through the associated air-guide pipe 75. By the electromagnetic valves 76 thus provided, it becomes possible to control the blasting condition of the second nozzle group 79 in a relatively simple manner while monitoring the condition of the sheet glass being quenched. The manual valves 77 are provided to open and close the air-guide pipes 75 by hand.

As described previously, the upper and lower first nozzles 37a, 27a of the first quench unit 20 (FIG. 1) are arranged zigzag, and the air-guide pipes 75 of the second quench unit 70 extend obliquely at the angle a to the axis of the air-supply pipe 72. The oblique angle a of the air-guide pipes 75 is determined such that the air-guide pipes 75 extend parallel with rows of diagonally aligned ones of the first nozzles 37a, 27a (only upper first nozzles 37a being shown in FIG. 5) of the first quench unit 20. Each of the air-guide pipes 75 can, therefore, be located intermediately between one pair of adjacent rows of diagonally aligned first nozzles 37a (27a). The second nozzles 78 (forming the second nozzle group 79) at the free ends of the air-guide pipes 75 are in parallel with the direction of travel of the small-thickness glass sheet 12. In the position shown in FIG. 5, the second nozzles 78 can issue compressor air onto a central portion 15 between the right and left edges of the small-thickness glass sheet 12.

Figure 5:
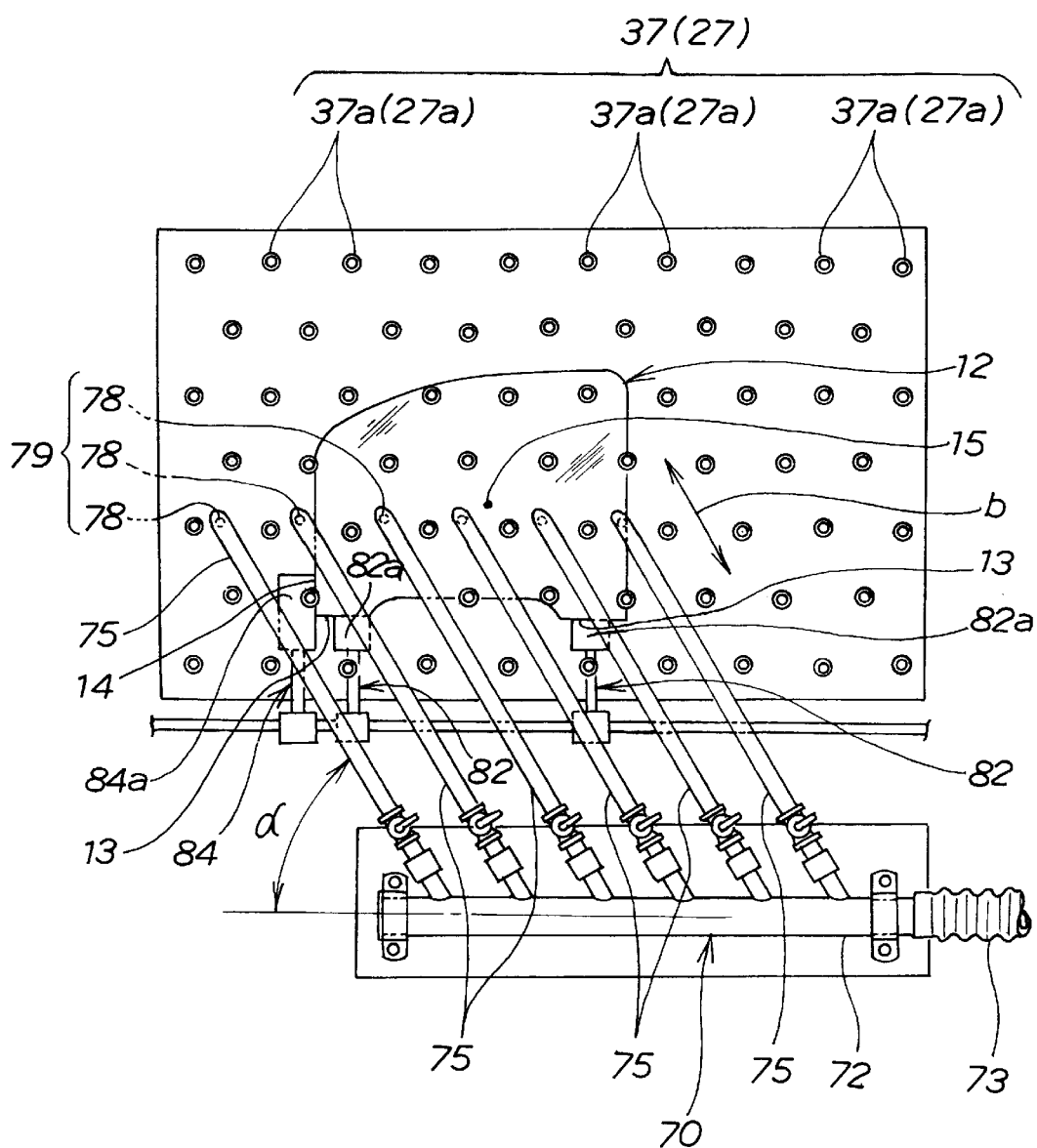
FIG. 5 is a plan view showing the arrangement of a second quench section of the glass quenching apparatus.

By properly operating the rodless cylinders 43, 43 (FIG. 3), the second quench section 70 can move the second nozzle group 79 (nozzles 78) in the direction of the arrow b shown in FIG. 5 until the second nozzle group 79 is located at a desired position relative to a glass sheet 12 to be quenched.

Since the second nozzle group 79 is movable in the direction of the arrow b, it can be positioned relative to the desired region of any of the small-thickness glass sheets of different sizes, so that the small-thickness glass sheets of different sizes can be quenched under optimum conditions.

The second nozzle group 79 which is movable in the direction of the arrow b can direct blasts of compressor air onto only a desired region of the small-thickness glass sheet 12 to be quenched. Thus, wastage of the compressor air can be avoided.

The region of the small-thickness glass sheet on which compressor air is jetted may be a central region, the right edge 13 (lower edge shown in FIG. 5), or a part of the rear edge 14 of the small-thickness glass sheet 12. This is because the central region of the small-thickness glass sheet 12 is hard to cool as compared to another region of the small-thickness glass sheet 12. The lower edge 13 and rear edge 14 of the small-thickness glass sheet 12 are also hard to cool because due to direct contact with the arms 82, 84, these edges 13, 14 are subjected to heat transferred from the arms 82, 84. The arms 82, 84 are made of metal and can retain heat received during the preceding glass bending process.

Figure 6:
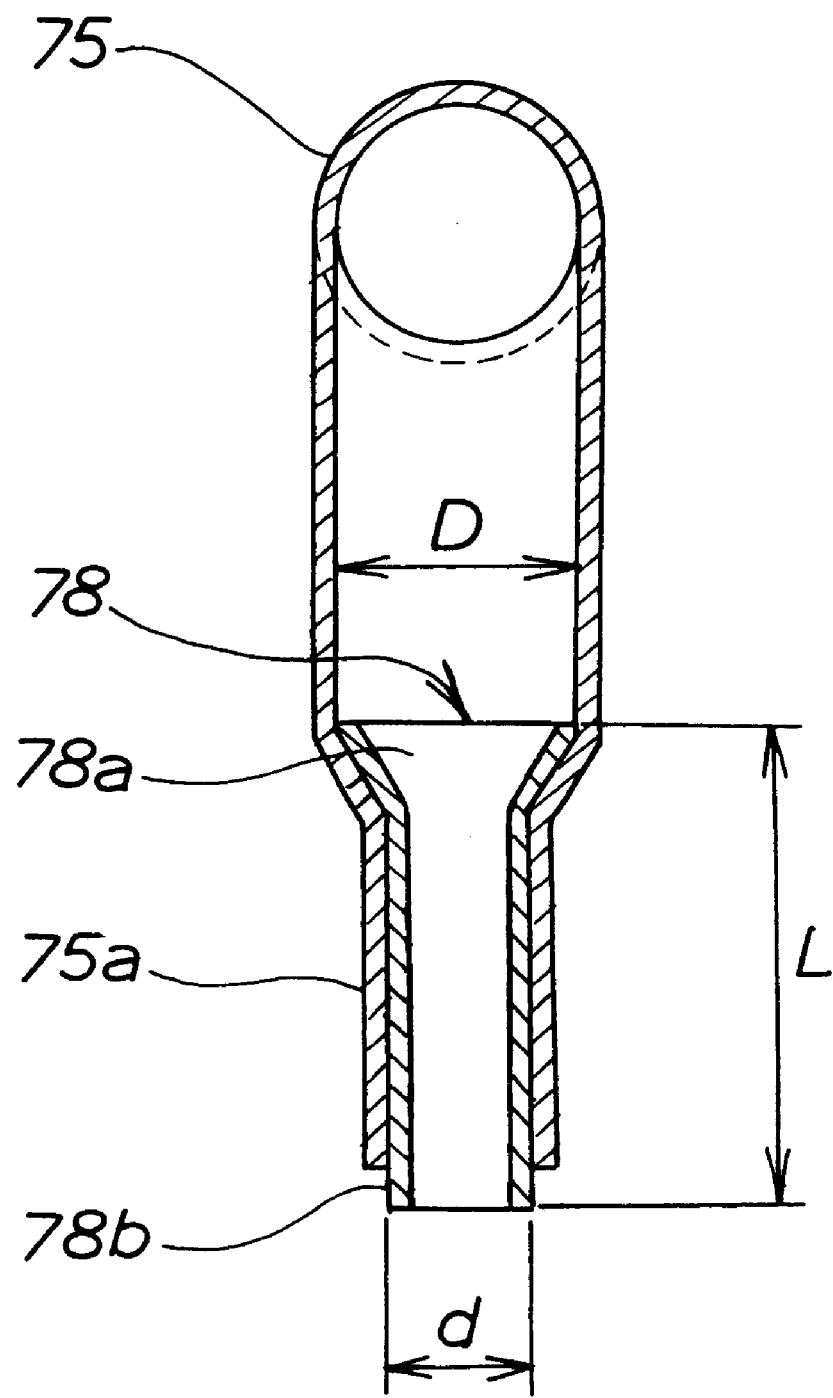
FIG. 6 is a cross-sectional view taken along line VI—VI of FIG. 4.

Reference is made to FIG. 6 which is a cross-sectional view taken along line VI—VI of FIG. 4. As shown in this figure, each of the second nozzles 78 is attached by clinching it to a lower end portion 75a of the downwardly bent free end of the associated air-guide pipe 75. In the illustrated embodiment, the lower end portion 75a of the air-guide pipe 75 is squeezed to reduce its diameter with the second nozzle 78 held therein.

The second nozzle 78 is a bell-mouth nozzle made, for example, of brass or copper. A flared upper end 78a of the bell-mouth nozzle 78 has a maximum outside diameter D greater than that d of a lower end 78b of the second nozzle 78. The length L and outside diameter d of the second nozzle 78 are designed to satisfy a condition expressed by the inequality $L \geq 3 \times d$. If $L < 3 \times d$, compressor air emitted from the second nozzle 78 tends to spread out and thus makes it difficult to achieve an accurate blasting of the compressor air onto the desired region of the small-thickness glass. In other words, by the second nozzles 78 designed to satisfy the inequality $L \geq 3 \times d$, blasts of compressor air issued from the nozzles 78 can be accurately directed onto the desired region of the small-thickness glass sheet.

The outside diameter d of the second nozzle 78 as measured at the lower end 78b of the second nozzle 78 is in the range of 1.0 to 2.0 mm. This diameter is much smaller than the inside diameter D of the air-guide pipe 75. The air-guide pipe 75, owing to its inside diameter being much larger than that of the second nozzle 78, can serve also as an air chamber, so that compressor air is issued from the second nozzles 78 at a high pressure. The high-pressure compressor air then possesses a large cooling capacity which is sufficient to quench the desired region of the small-thickness glass sheet efficiently with minimum use of compressor air without affecting the quality of another region of the small-thickness glass sheet.

The glass quenching apparatus 10 of the foregoing construction operates as follows.

Figure 7A:
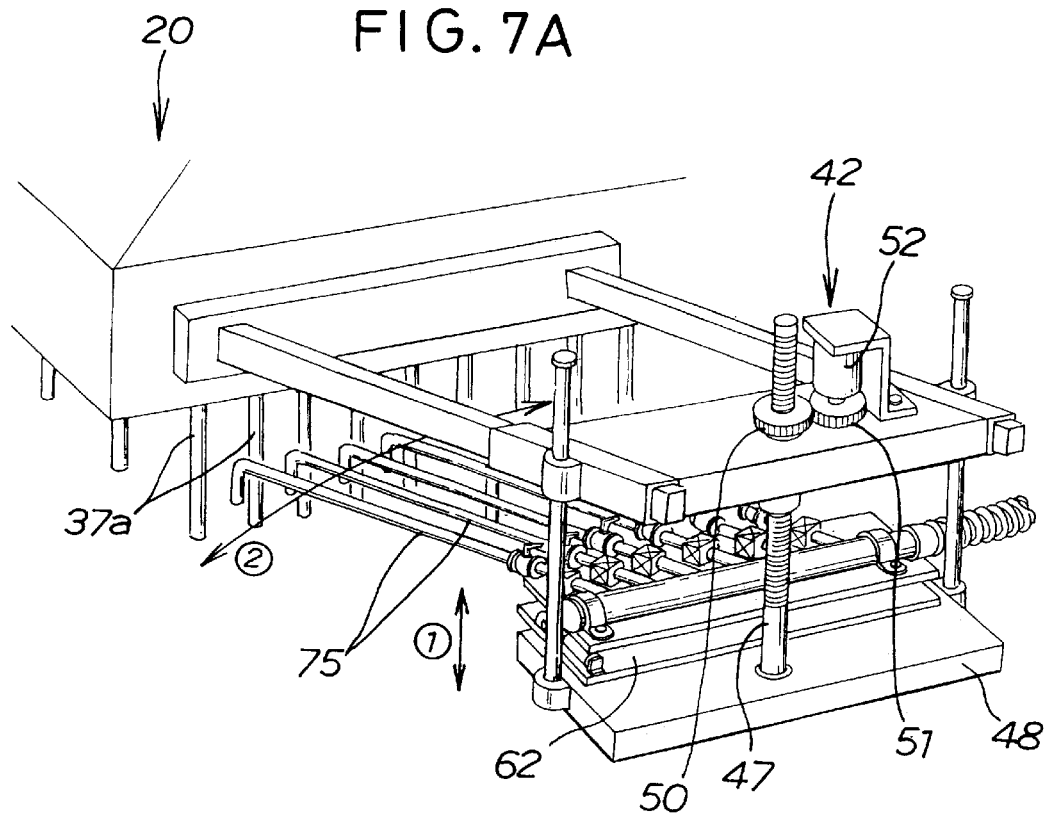
FIGS. 7A and 7B are schematic perspective views illustrative of the manner in which a second nozzle group of the glass quenching apparatus is moved up and down and left and right with respect to a path of movement of the glass sheet.

As shown in FIG. 7A, the drive motor 52 of the nozzle moving device 42 is driven to rotate the drive gear 51. Rotation of the drive gear 51 is transmitted via the driven gear 50 and the nut 46 (FIGS. 3 and 4) of the ball screw to the screw shaft 47 of the ball screw. Upon rotation of the nut 46, the screw shaft 47 moves in an axial direction to thereby raise or lower the lift plate 48 for moving the air-guide pipes 75 in a vertical direction as indicated by the arrow 1 in a circle. By thus moving the air-guide pipes 75, the second nozzles 78 (FIGS. 4 and 5) can be set in a desired vertical position or level.

Then, the drive motor 64 (FIG. 4) of the adjusting device 60 is driven to rotate the drive gear 63a. Rotation of the drive gear 63a is transmitted via the driven gear 63 to the rotary shaft 61. As the rotary shaft 61 angularly moves or turns about its own axis, the swing plate 62 turns about the axis of the rotary shaft 61 in unison with the rotary shaft 61, so that the air-guide pipes 75 are caused to swing in a horizontal plane, as indicated by the arrow 2 in a circle shown in FIG. 7A. Through such swinging movement, the air-guide pipes 75 are adjusted in position relative to the upper first nozzles 37a of the first quench unit 20 such that the air-guide pipes 75 are arranged in parallel with rows of diagonally aligned upper first nozzles 37a. With this positional adjustment, the air-guide pipes 75 can be inserted into spaces between adjacent rows of diagonally aligned upper first nozzles 37a without interference with the upper first nozzles 37a, as described below.

Figure 7B:
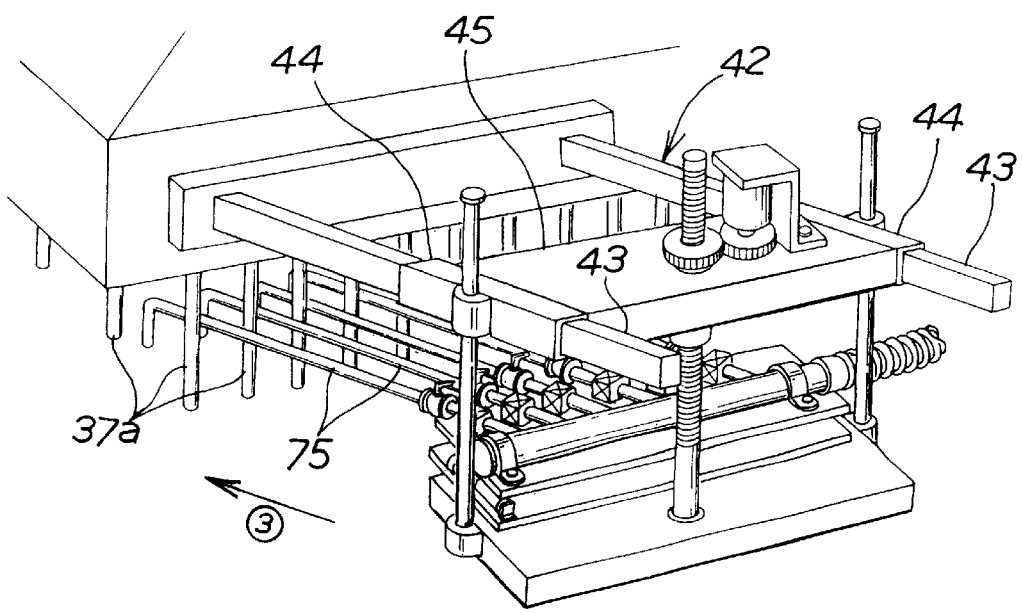
Figure 8A:
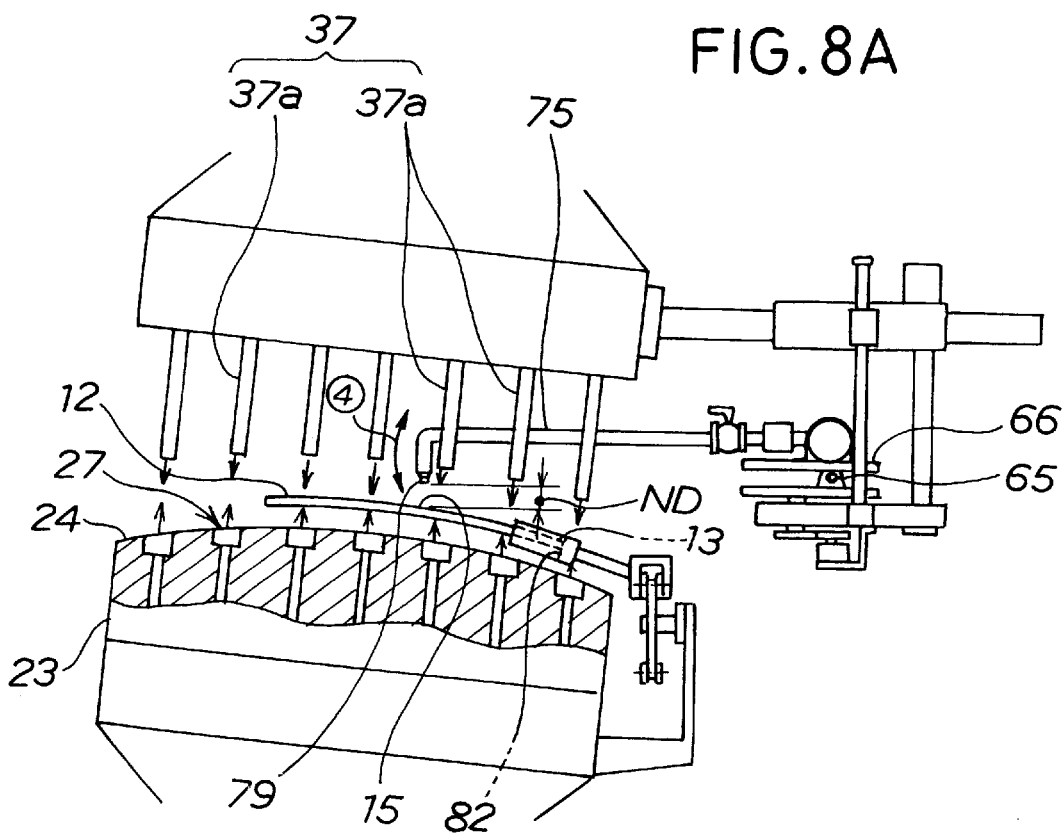
FIGS. 8A and 8B are schematic perspective views illustrative of the manner in which the second nozzle group is swung in a vertical plane to adjust the nozzle distance.

Thereafter, the rodless cylinders 43, 43 of the moving device 42 are operated to move the respective moving members 44, 44 and the cross member 45 in a direction indicated by the arrow 3 in a circle shown in FIG. 7B. With this movement of the cross member 45, the air-guide pipes 75 are inserted into spaces defined between the adjacent rows of diagonally aligned upper first nozzles 37a of the first quench unit 20 until the second nozzle group 79 is located in a desired position shown in FIG. 8A.

Subsequently, blower air is blasted upward from the lower first nozzle group 27 of the floating bed 23 so that a small-thickness glass sheet 12 is raised in a floating condition above the floating bed 23 by the pressure of blower air. In this instance, since the vertical axis L (FIG. 2) of the first quench unit 20 is inclined with respect to the perpendicular Lv (FIG. 2), the floating small-thickness glass sheet 12 is urged rightward in FIG. 8A by the pressure of blower air in such a manner that the right edge 13 of the small-thickness glass sheet 12 comes into abutment with the edge support members 82a (FIGS. 2 and 5) of the support arms 82. The right edge 13 of the small-thickness glass sheet 12 is thus supported by the support arms 82. In this condition, the second nozzle group 79 is disposed above a central region of the small-thickness glass sheet 12.

In synchronism with jetting of the blower air from the lower first nozzle group 27, the upper nozzles 37a of the upper first nozzle group 37 also jet blower air downward onto the upper surface of the small-thickness glass sheet 12.

Then, the drive motor 68 (FIG. 4) of the adjusting device 60 is driven to rotate the drive gear 67a. Rotation of the drive gear 67a is transmitted via the worm gear 67 to the pin 65. As the pin 65 angularly moves or turns about its own axis, the tilt plate 66 turns about the axis of the pins 65 to thereby swing the air-guide pipes 75 in a vertical plane, as indicated by the arrow 4 in a circle shown in FIG. 8A. By thus swinging the air-guide pipes 75, the distance between the second nozzle group 79 and the small-thickness glass sheet 12 (i.e., nozzle distance: ND) can be adjusted to an optimum value.

Figure 8B:
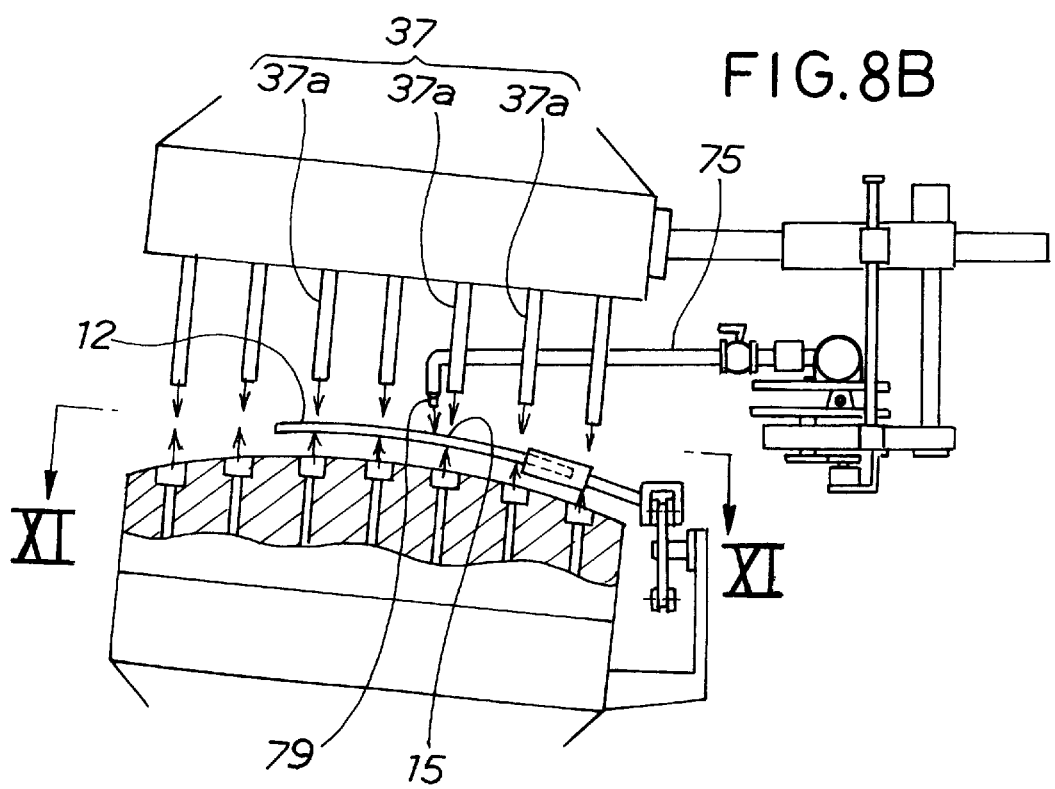

Thereafter, compressor air is blasted from the second nozzle group 78 onto the central region of the upper surface of the small-thickness glass sheet 12, as shown in FIG. 8B.

Figure 9:
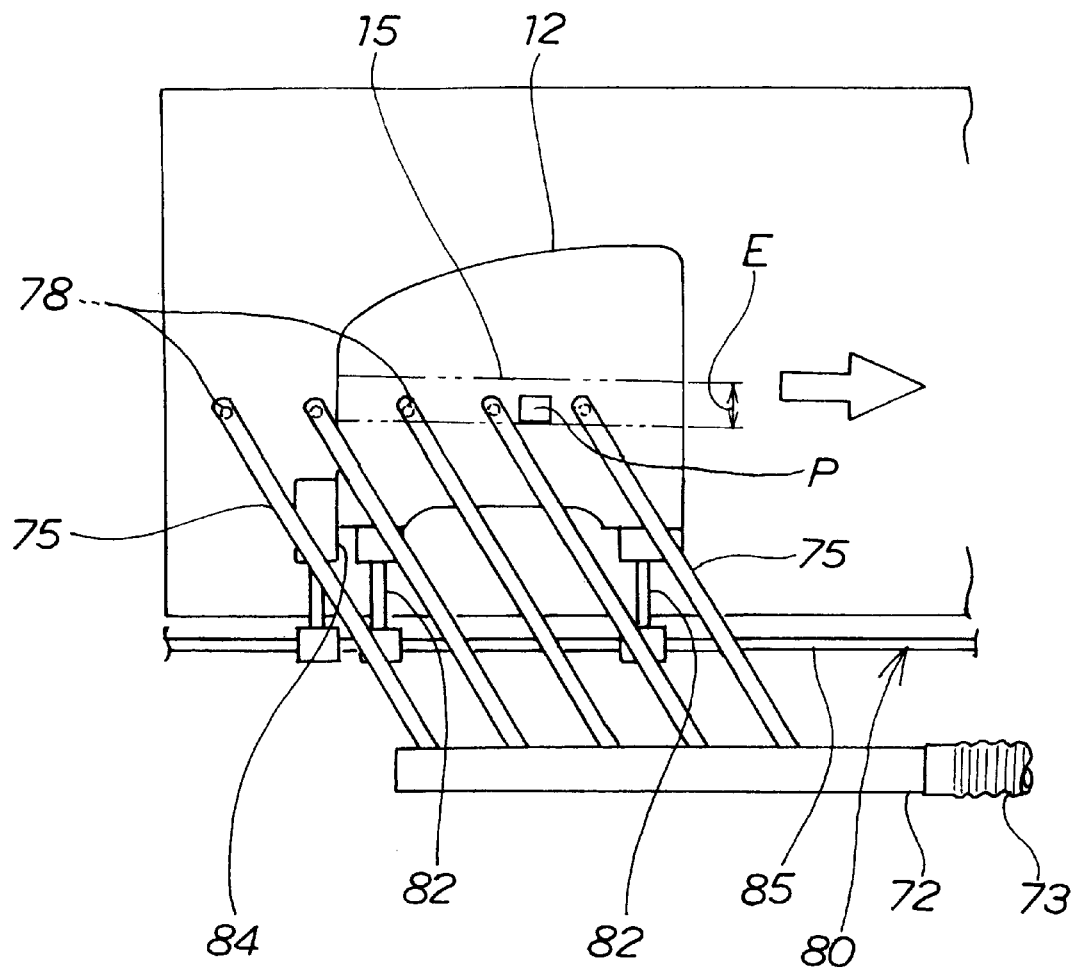
FIG. 9 is a plan view illustrative of the manner in which a conveyor unit operates to advance the glass sheet below the second nozzle group.

The conveyor unit 80 shown in FIG. 9 is driven so that the drive chain 85 travels along a closed loop-like path to move the small-thickness glass sheet 12 in the direction of the profiled arrow via the movement of the support arms 82 and the pusher arm 84 of the conveyor unit 80 in the same direction. During conveyance of the small-thickness glass sheet 12, the central region E of the glass sheet 12 is quenched at the same degree as the other region of the glass sheet 12.

Figure 10A:
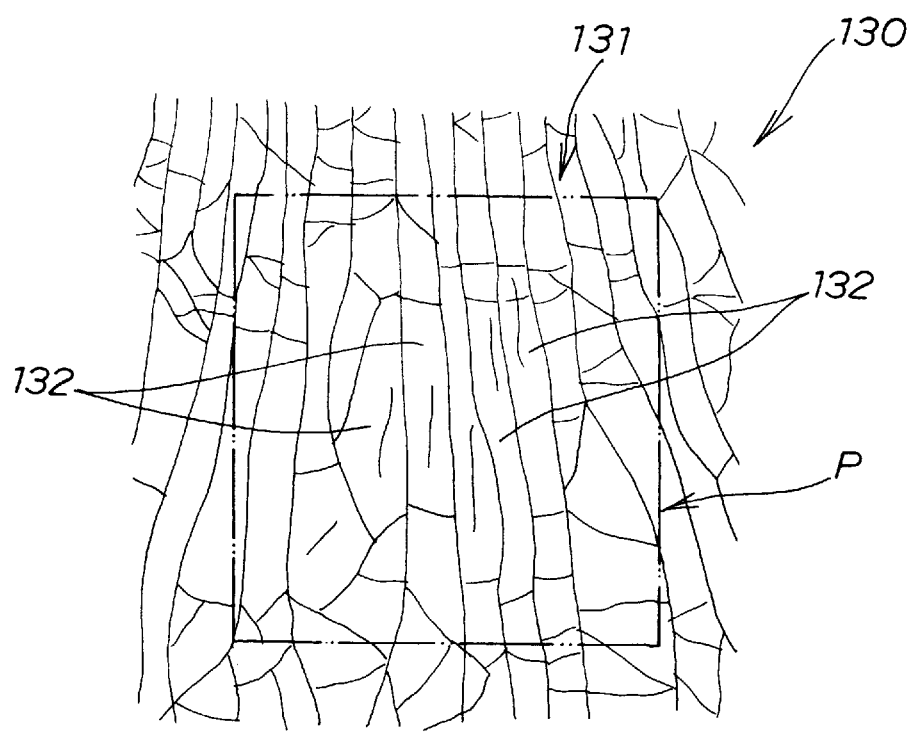
FIG. 10A is a view showing the structure of a conventionally quenched glass sheet when broken.
Figure 10B:
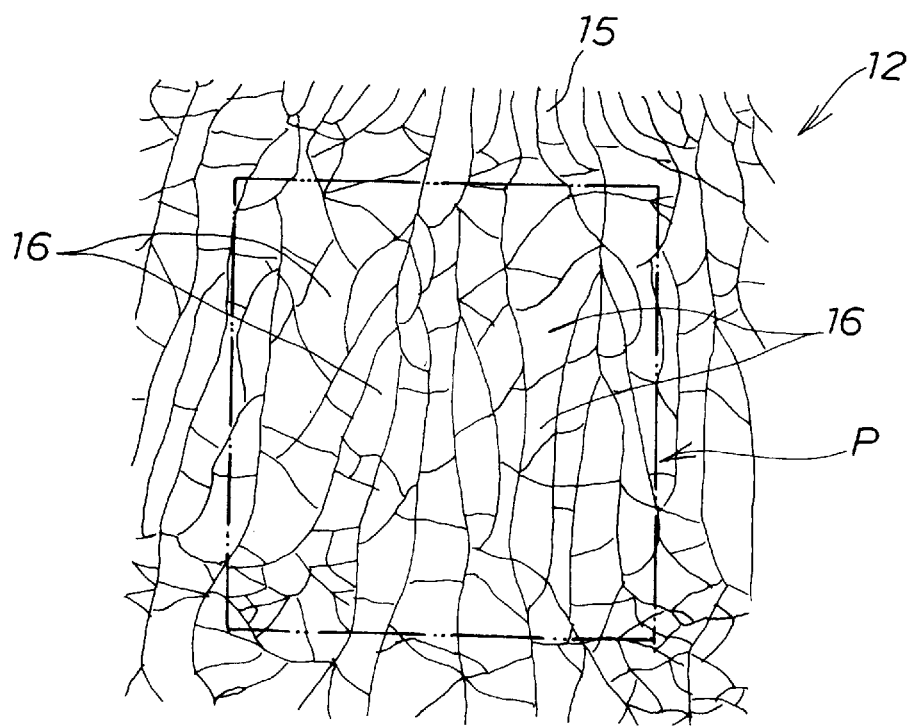
FIG. 10B is a view showing the structure of a quenched glass sheet of the present invention when broken.

For comparative purposes, a small-thickness glass sheet 130 quenched by a conventional quenching apparatus and a small-thickness glass sheet 12 quenched by the inventive glass quenching apparatus were tested for broken structure with the results shown in FIGS. 10A and 10B, respectively. In each of these figures, a square area P bounded by phantom lines corresponds to the position P shown in FIG. 9.

The conventional glass quenching apparatus is unable to quench the central region of the small-thickness glass sheet 130 at the same degree as the peripheral edge portion. Accordingly, the conventionally quenched glass sheet 130 when broken is likely to form elongated broken pieces (called "splines") 132, as shown in FIG. 10A, and thus fails to satisfy the standardized requirements specified for the tempered glass sheets.

By contrast, the inventive glass quenching apparatus is able to quench the central region 15 of the small-thickness glass sheet 12 at the same degree as the peripheral edge portion of the glass sheet. Thus, the quenched glass sheet 12 when broken forms finely broken pieces 16, as shown in FIG. 10B, and thus is able to satisfy the standardized requirement specified for the tempered glass sheets.

In the embodiment shown in FIGS. 1–9, the second nozzles 78 of the second quench section 70 are moved to a position located directly above a path of movement of the central region 15 of the small-thickness glass sheet 12 so that the small-thickness glass sheet 12 is quenched uniformly over the entire area thereof. The second nozzles 78 may be displaced to a position located above a path of movement of the right edge 13 (FIG. 5) and a portion of the rear edge 14 (FIG. 5) located close to the right edge 13. By thus displacing the second nozzles 78, the edge portions 13, 14 can be quenched by compressor air in the same manner as another part of the small-thickness glass sheet 12. This arrangement is particularly advantageous because the right edge 13 and the rear edge portion 14, which are held in direct contact with the metal arms 82, 84 during conveyance of the glass sheet 12, are unlikely to become cool due to heat transmitted from the metal arms 82, 84.

Figure 11A:
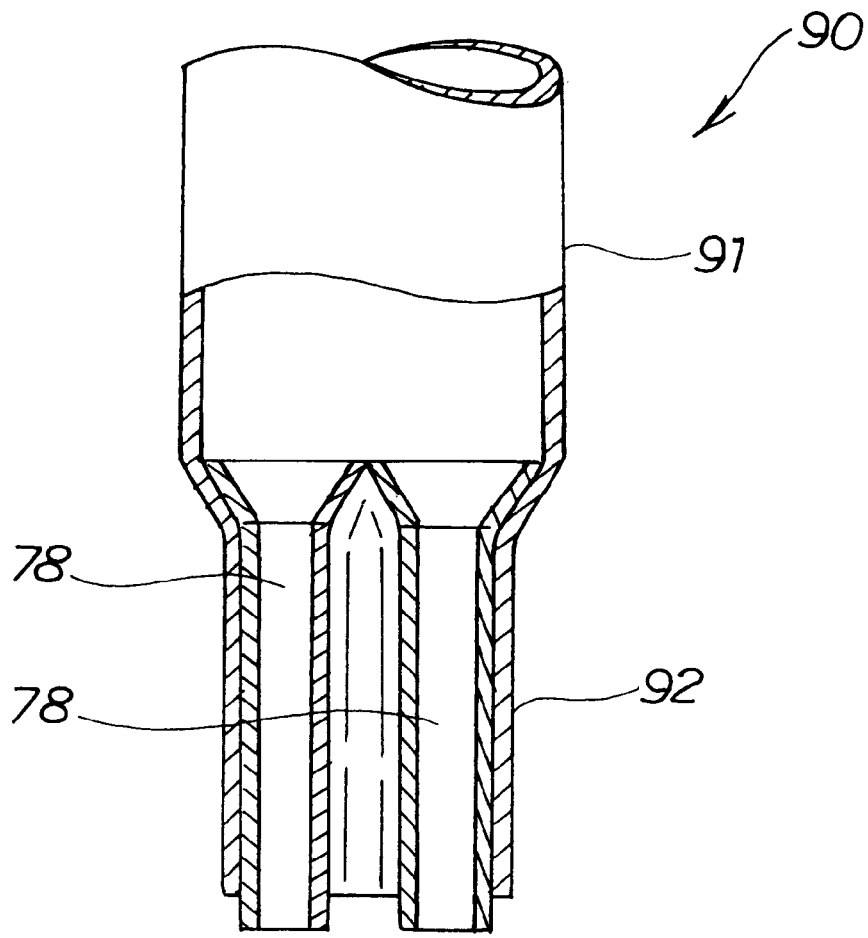
FIG. 11A is a cross-sectional view showing a modified form of the second nozzle of the glass quenching apparatus.
Figure 11B:
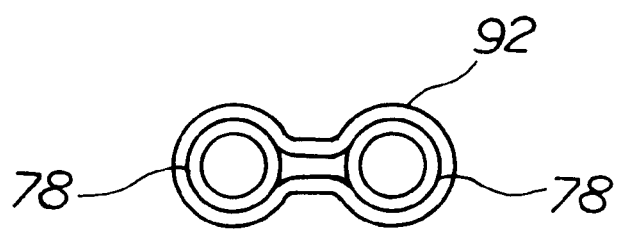
FIG. 11B is an end view of the modified second nozzle.

FIGS. 11A and 11B show a modified form of the second quench section according to the present invention.

The modified second quench section 90 includes air-guide pipes (one being shown) 91 having a larger diameter than the air-guide pipes 75 of the first embodiment shown in FIG. 6 so that two nozzles 78 can be attached by clenching to the free end of each air-guide pipe 91.

Figure 12:
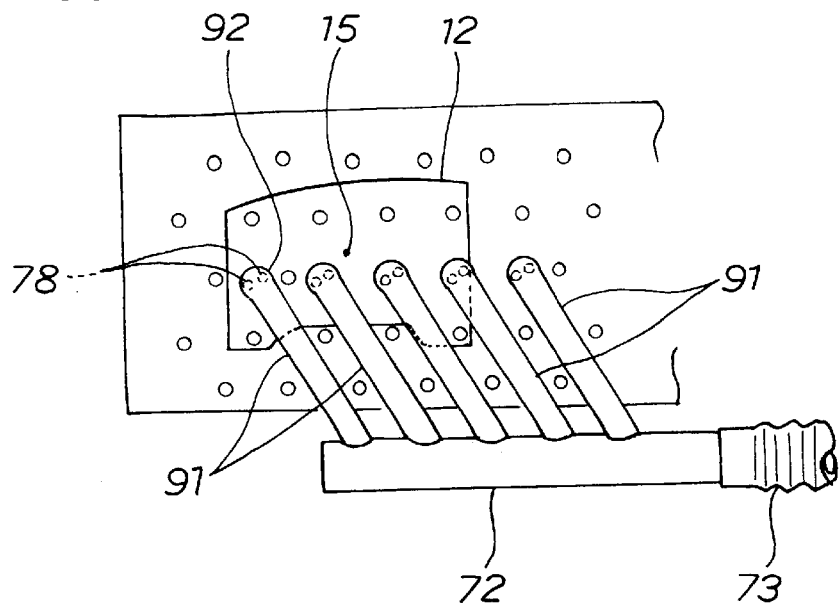
FIG. 12 is a schematic plan view of a second nozzle section including the modified second nozzles of FIGS. 11A and 11B.

By virtue of the twin nozzles 78, the modified second quench section 90 (FIG. 12) is able to blast more volume of compressor air than as blasted from the second quench section 70 shown in FIGS. 1–9, so that the upper surface of the central region 15 of the small-thickness glass sheet 12 shown in FIG. 12 is quenched with improved efficiency. With this highly efficient quenching, the resulting tempered glass sheet has improved qualities.

Figure 13:
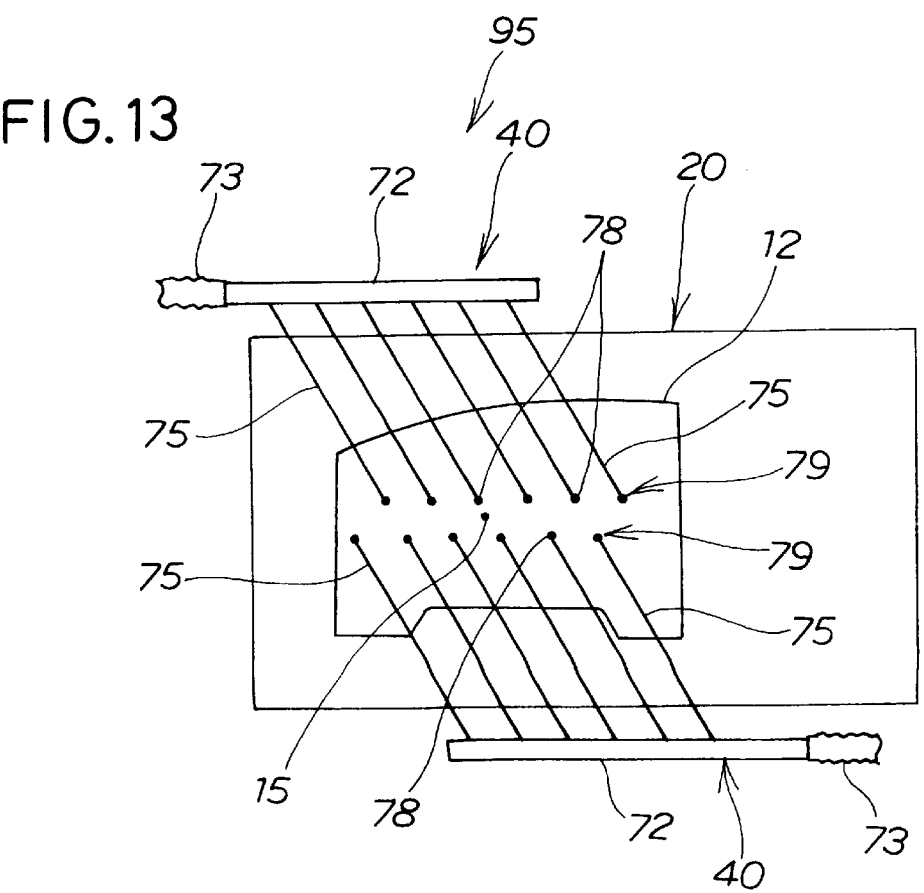
FIG. 13 is a diagrammatical plan view showing a glass quenching apparatus according to a second embodiment of the present invention.
Figure 14:
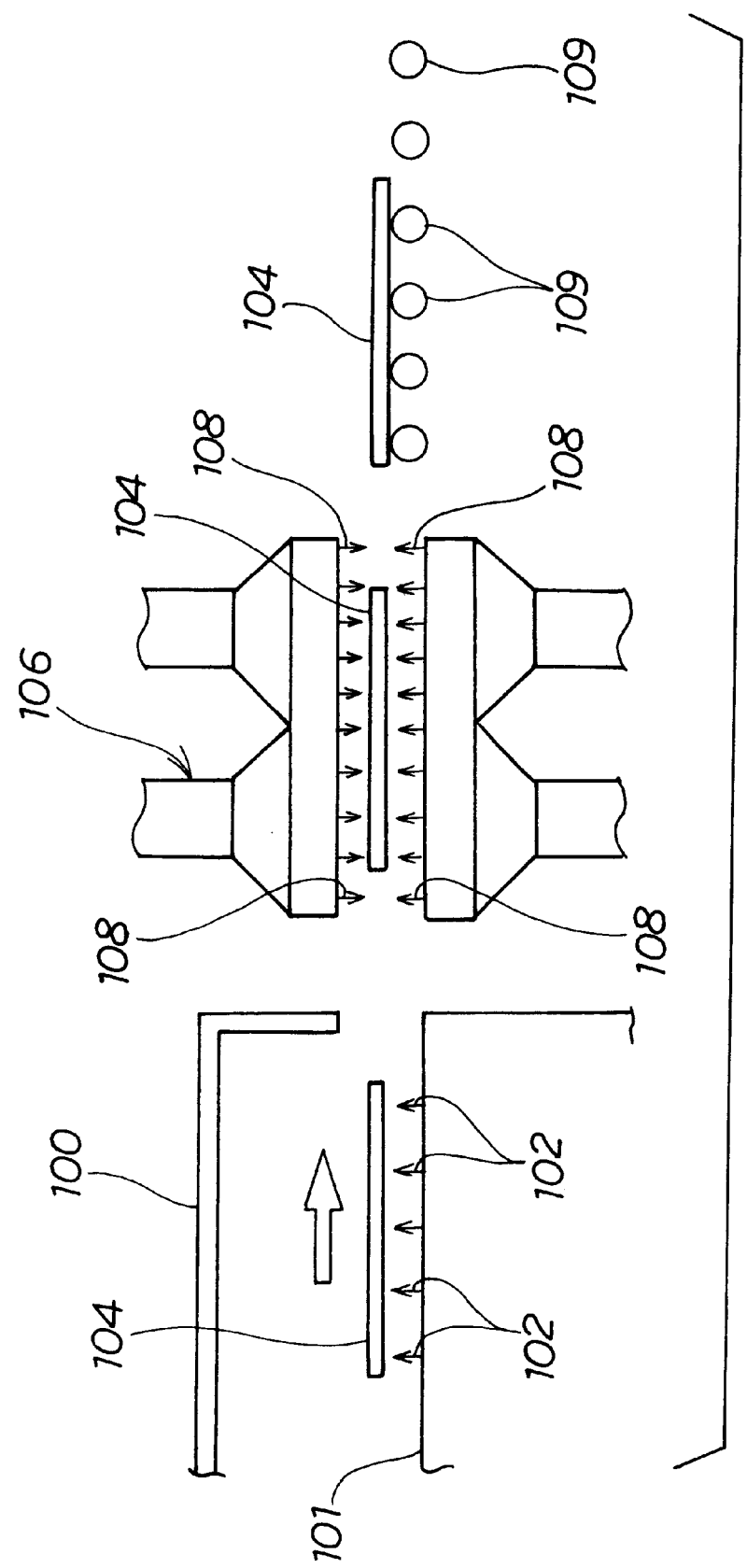
FIG. 14 is a diagrammatical view showing a conventional tempered glass manufacturing method.
Figure 15A:
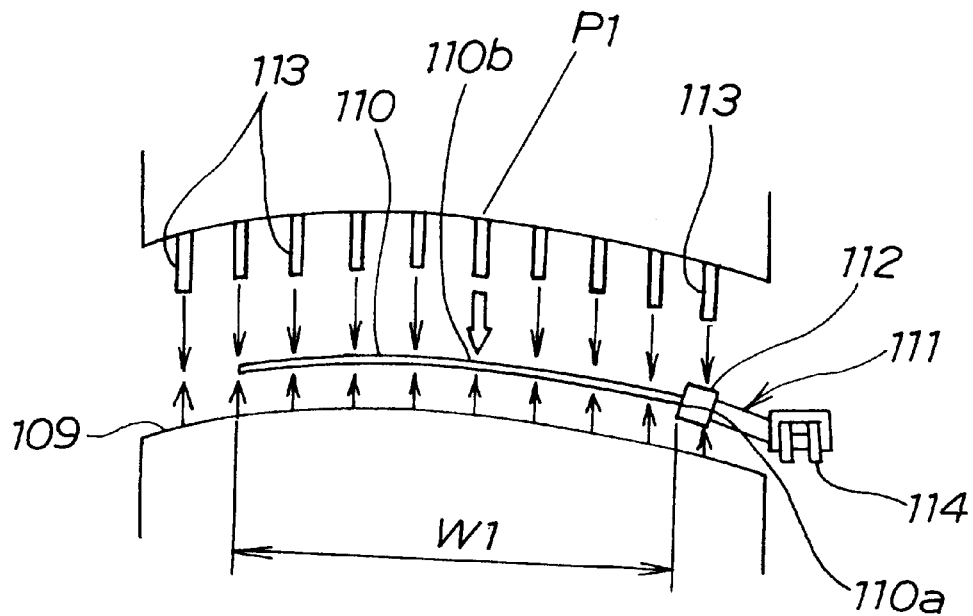
FIGS. 15A and 15B are diagrammatical views explanatory of basic operating principles of a conventionally-known glass quenching apparatus.
Figure 15B:
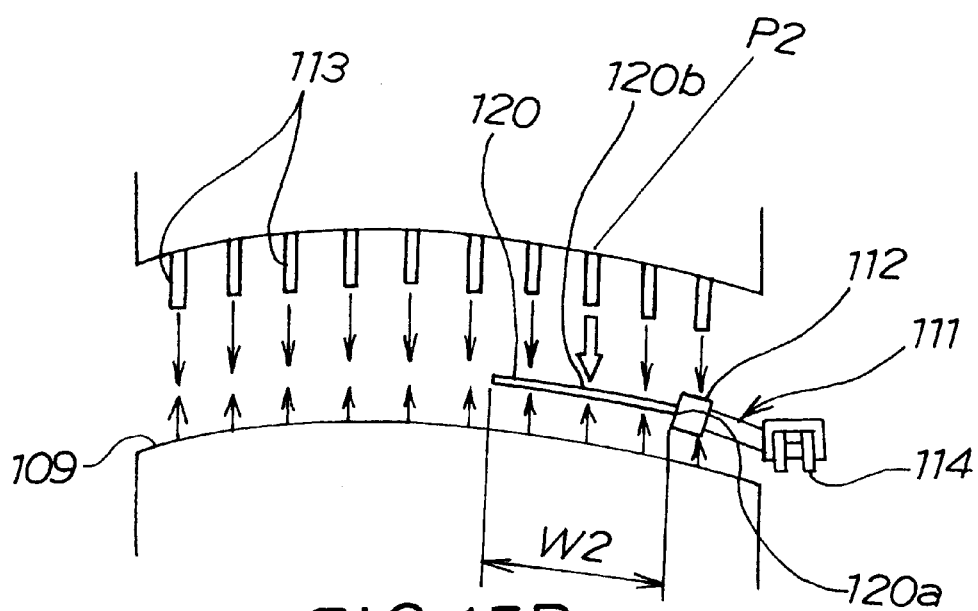

FIG. 13 shows in diagrammatical plan view a glass quenching apparatus 95 according to a second embodiment of the present invention.

The glass quenching apparatus 95 differs from the apparatus 10 of the first embodiment shown in FIGS. 1–9 in that the second quench unit 40 is disposed on both left and right sides of the first quench unit 20.

With this arrangement, since two second nozzle groups 79, 79 are disposed in juxtaposition, the central region 15 of a small-thickness glass sheet 12 being conveyed is cooled or quenched intensively by blasts of compressor air issued from the two second nozzle groups 79, 79. With this intensive quenching of the central region, the qualities of the resulting tempered glass sheet 12 are further improved.

In the embodiments described above, the glass quenching apparatuses of the present invention are used in the manufacture of a curved tempered glass sheet for quenching a curved small-thickness glass sheet 12 to temper the same. The glass quenching apparatus of the present invention can be also used for adjusting the curvature of the curved small-thickness glass sheet.

In the latter-mentioned application, while the small-thickness glass sheet is quenched on the quenching apparatus, the electromagnetic valves 76 (FIGS. 3–5) of the second quench section 70 are operated to change the cooling capacity of the quenching apparatus in such a manner that due to a difference in cooling capacity between an upper unit and a lower unit of the quenching apparatus, there arises a temperature difference between the upper and lower surfaces of the curved small-thickness thickness glass sheet 12 being quenched. By properly controlling the temperature difference thus created, the widthwise curvature of the small-thickness glass sheet 12 can be adjusted.

Due to its additional application or use, the glass quenching apparatus can exhibit a high operation rate and an increased rate of production of the tempered glass sheets.

Although in the embodiments described above the glass quenching apparatus is used for quenching small-thickness glass sheets having a thickness in the range of 1.5 mm to 3.0 mm, the apparatus is effectively operative when used with glass sheets of a different thickness. Examples of the small-thickness glass sheets include float glass sheets, polished glass sheets and figured glass sheets.

In the illustrated embodiments described above, the second nozzles 78 are attached by clenching to the respective free ends of the air-guide pipes 75. The second nozzles 78 may be omitted in which instance the free ends of the air-guide pipes 75 are drawn or squeezed to form nozzles of a reduced diameter.

The electromagnetic valves 76 attached to the air-guide pipes 75 of the second quench section 70 may be omitted.

In the second quench unit 40 shown in the illustrated embodiment, the nozzles are movable left and right and up and down by means of the nozzle moving device 42, and the nozzles are also movable to swing in both horizontal and vertical directions by means of the adjusting device 60. Another arrangement may be employed to achieve the foregoing movements of the nozzles.

As described above, the glass quenching apparatus of the present invention includes a second nozzle group comprised of movable nozzles which can be positioned accurately with respect to the desired region (hard-to-cool portion) of any of the glass sheets of different sizes. With the movable nozzles thus positioned, respective hard-to-cool portions of the glass sheets of different sizes are quenched by compressor air issued from the second nozzle group under optimum conditions. The remaining part of the small-thickness glass sheets is quenched by means of blower air issued from the first nozzle group. Since the desired region (hard-to-cool portion) of any of the small-thickness glass sheets of different sizes can be quenched merely by adding the second nozzle group, the overall equipment cost of the glass quenching apparatus is relatively low and does not increase the manufacturing cost of the tempered glass sheets.

Additionally, since use of the movable second nozzle group enables blasting of compressor air focused onto the hard-to-cool portion of a small-thickness glass sheet, air can be used efficiently without substantial loss.

The glass sheet while being held in a floating condition is fed along a conveyance path by means of arms of the conveyor unit. Since the second nozzle group is positioned accurately with respect to a desired region (hard-to-cool portion) of the small-thickness glass sheet, jets of compressor air issued from the second nozzle group will trace the desired region of the glass sheet as the glass sheet is conveyed by the conveyor unit. Thus the hard-to-cool portion of the glass sheet is quenched efficiently with no substantial wastage of compressor air incurred.

In the case where the arms of the conveyor unit hinder smooth and efficient quenching of the edge portions of the glass sheet due to heat transmitted from the arms to the glass sheet, the second nozzle group may be displaced to a position aligned with a path of movement of the glass sheet edge portions, so that the glass sheet edge portions are quenched by compressor air issued from the second nozzle group. Thus, the glass sheet is quenched uniformly over the entire area thereof and hence is able to possess improved qualities.

Obviously, various minor changes and modifications of the present invention are possible in the light of the above teaching. It is therefore to be understood that within the scope of the appended claims the invention may be practiced otherwise than as specifically described.

What is claimed is:

1. A glass quenching apparatus for quenching a glass sheet while being fed along a conveyance path, the glass sheet being previously heated to a predetermined temperature, said glass quenching apparatus comprising:
   a first nozzle group for jetting blower air onto opposite surfaces of the glass sheet, said first nozzle group being comprised of stationary nozzles;
   a second nozzle group for jetting compressor air onto at least one of said opposite surfaces of the glass sheet, said second nozzle group be are capable of moving parallel to a plane of the glass sheet; and
   means for horizontally conveying the glass sheet along the conveyance path.

2. A glass quenching apparatus according to claim 1, wherein said movable nozzles are arranged in at least one row extending parallel with the conveyance line.

3. A glass quenching apparatus according to claim 1, wherein said movable nozzles having a length and a diameter, said length being at least three times as large as the diameter.

4. A glass quenching apparatus according to claim 1, further including a nozzle moving device for moving said second nozzle group in both a first direction transverse to a direction of movement of the glass sheet, and a second direction perpendicular to said plane of the glass sheet.

5. A glass quenching apparatus according to claim 4, further including an adjusting device associated with said nozzle moving device and operative to swing said movable nozzles horizontally and vertically to adjust the position of said movable nozzles relative to the glass sheet.

6. A glass quenching apparatus according to claim 4, further including a horizontally disposed air-supply pipe having one end closed and an opposite end connected in fluid communication with a source of said compressor air, and a plurality of substantially horizontal, parallel spaced air-guide pipes connected at one end to a circumferential wall of said air-supply pipe and held in fluid communication with said air-supply pipe, respective other ends of said air-guide pipes being bent to face toward said one surface of the glass sheet and each equipped with at least one of said movable nozzles, wherein said nozzle moving device includes a pair of parallel spaced cantilevered rodless cylinders laid in parallel with said air-guide pipes and having a pair of movable members, respectively, reciprocally movable in said first direction, a cross member interconnecting said movable members of the rodless cylinders, a ball screw composed of a nut attached to said cross member and a screw shaft threaded with said nut and extending vertically through said cross member, a lift plate connected at one end of said screw shaft and supporting thereon said air-supply pipe, and a first drive motor mounted on said cross member and rotating said screw shaft for causing the lift plate to reciprocate in said second direction.

7. A glass quenching apparatus according to claim 6, wherein said bent other ends of said air-guide pipes are each equipped with two of said movable nozzles.

8. A glass quenching apparatus according to claim 6, wherein said air-supply pipe, said air-guide pipes and said nozzle moving device are disposed on one side of the conveyance path.

9. A glass quenching apparatus according to claim 6, wherein said air-supply pipe, said air-guide pipes and said nozzle moving device are disposed on both sides of the conveyance path.

10. A glass quenching apparatus according to claim 6, further including an air chamber connected in fluid communication with a source of the blower air and having part of said stationary nozzles, wherein said stationary nozzles of said stationary nozzle part are arranged in a zigzag pattern and project downward from said air chamber, and said rodless cylinders are connected to said air chamber and extend obliquely to the conveyance path such that each of said air-guide pipes is movable in a space defined between one pair of adjacent rows of diagonally aligned stationary nozzles of said stationary nozzle part.

11. A glass quenching apparatus according to claim 5, further including a horizontally disposed air-supply pipe having one end closed and an opposite end connected in fluid communication with a source of said compressor air, and a plurality of substantially horizontal, parallel spaced air-guide pipes connected at one end to a circumferential wall of said air-supply pipe and held in fluid communication with said air-supply pipe, respective other ends of said air-guide pipes being bent to face toward said one surface of the glass sheet and each equipped with at least one of said movable nozzles, wherein said nozzle moving device includes a pair of parallel spaced cantilevered rodless cylinders laid in parallel with said air-guide pipes and having a pair of movable members, respectively, reciprocally movable in said first direction, a cross member interconnecting said movable members of the rodless cylinders, a ball screw composed of a nut attached to said cross member and a screw shaft threaded with said nut and extending vertically through said cross member, a lift plate connected at one end of said screw shaft and supporting thereon said air-supply pipe, and a first drive motor mounted on said cross member and rotating said screw shaft for causing the lift plate to reciprocate in said second direction, and wherein said adjusting device includes a horizontal swing plate rotatably mounted on said lift plate, a vertical tilt plate hinged to said swing plate so as to be pivotally movable in a vertical plane, a second drive motor for causing said swing plate to swing horizontally, and a third drive motor for causing said tilt plate to swing vertically, said air-supply pipe being mounted to said tilt plate.

12. A glass quenching apparatus according to claim 11, wherein said bent other ends of said air-guide pipes are each equipped with two of said movable nozzles.

13. A glass quenching apparatus according to claim 11, wherein said air-supply pipe, said air-guide pipes, said nozzle moving device and said adjusting device are disposed on one side of the conveyance path.

14. A glass quenching apparatus according to claim 11, wherein said air-supply pipe, said air-guide pipes, said nozzle moving device and said adjusting device are disposed on both sides of the conveyance path.

15. A glass quenching apparatus according to claim 11, further including an air chamber connected in fluid communication with a source of the blower air and having part of said stationary nozzles, wherein said stationary nozzles of said stationary nozzle part are arranged in a zigzag pattern and project downward from said air chamber, and said rodless cylinders are connected to said air chamber and extend obliquely to the conveyance path such that each of said air-guide pipes is movable in a space defined between one pair of adjacent rows of diagonally aligned stationary nozzles of said stationary nozzle part.

16. A glass quenching apparatus according to claim 1, further including means for horizontally conveying the glass sheet along the conveyance path while keeping the glass sheet in a floating condition by the pressure of air, said conveying means including a pusher arm adapted for abutting engagement with a rear edge of the glass sheet and at least one support arm adapted for abutting engagement with a side edge of the glass sheet, said pusher arm and said support arm being movable in unison with each other along the conveyance path so that the glass sheet is forcibly advanced by said pusher arm with the side edge being supported by said support arm.

17. A glass quenching apparatus according to claim 16, wherein said conveying means includes a floating bed having a number of nozzles formed therein and opening at one end to an upper surface said floating bed, said pusher arm and said support arm being disposed on one side of said floating bed, and said floating bed having a vertical axis inclined from the perpendicular toward said one side of said floating bed so that a side edge of the glass sheet is automatically brought into abutment with said support arm when the glass sheet is lifted up into a floating condition above said upper surface of the floating bed by the force of blower air issued from said nozzles of the floating bed.

* * * * *